Feb. 17, 1942.    W. H. WILSON    2,273,164
SEMITRAILER
Filed July 20, 1939    4 Sheets-Sheet 1
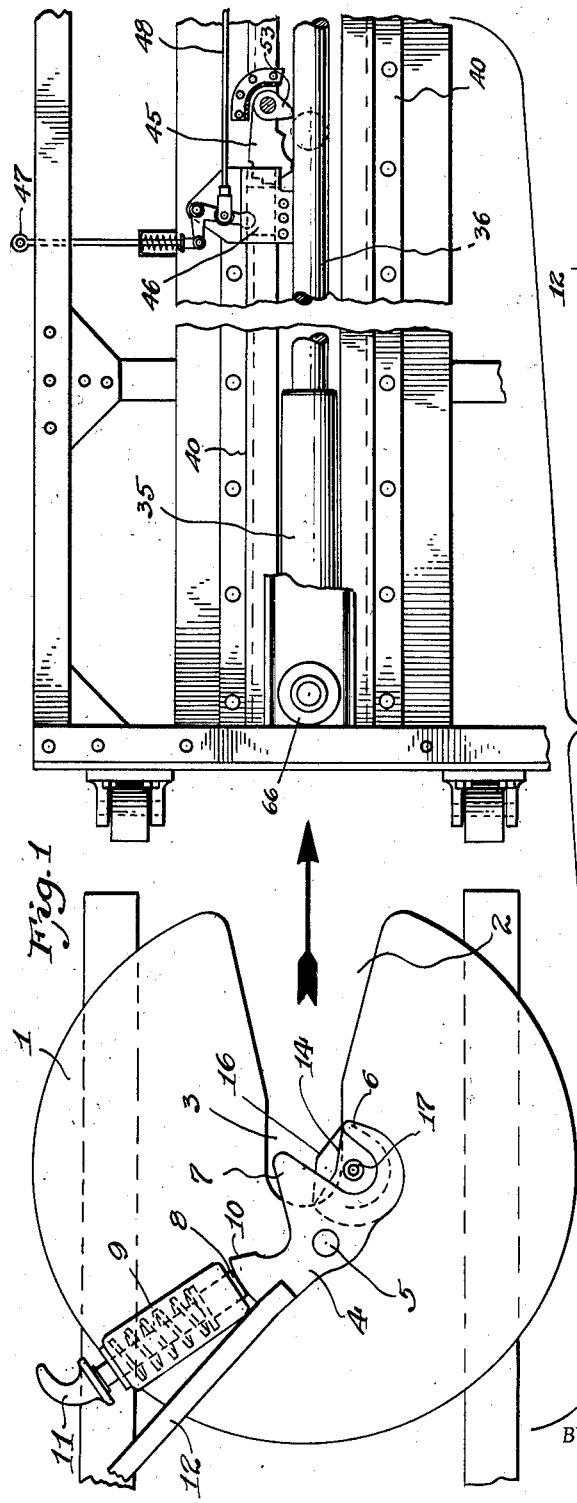
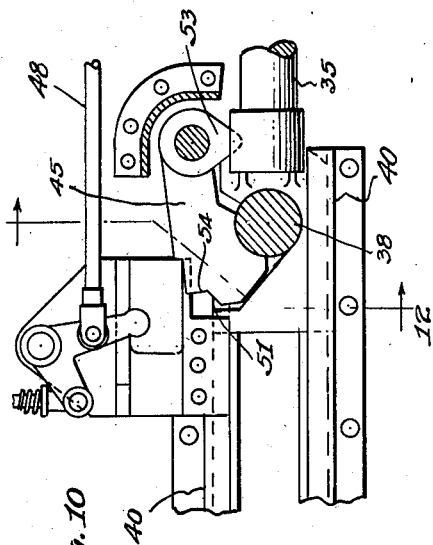
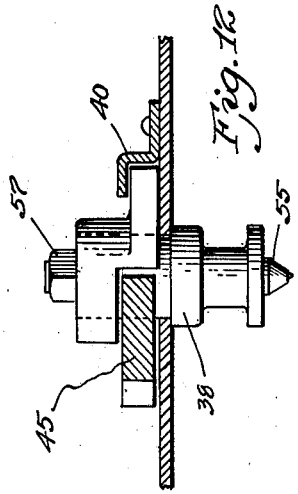
INVENTOR.
William H. Wilson
BY Barnes, Kisselle, Laughlin & Raisch
ATTORNEYS

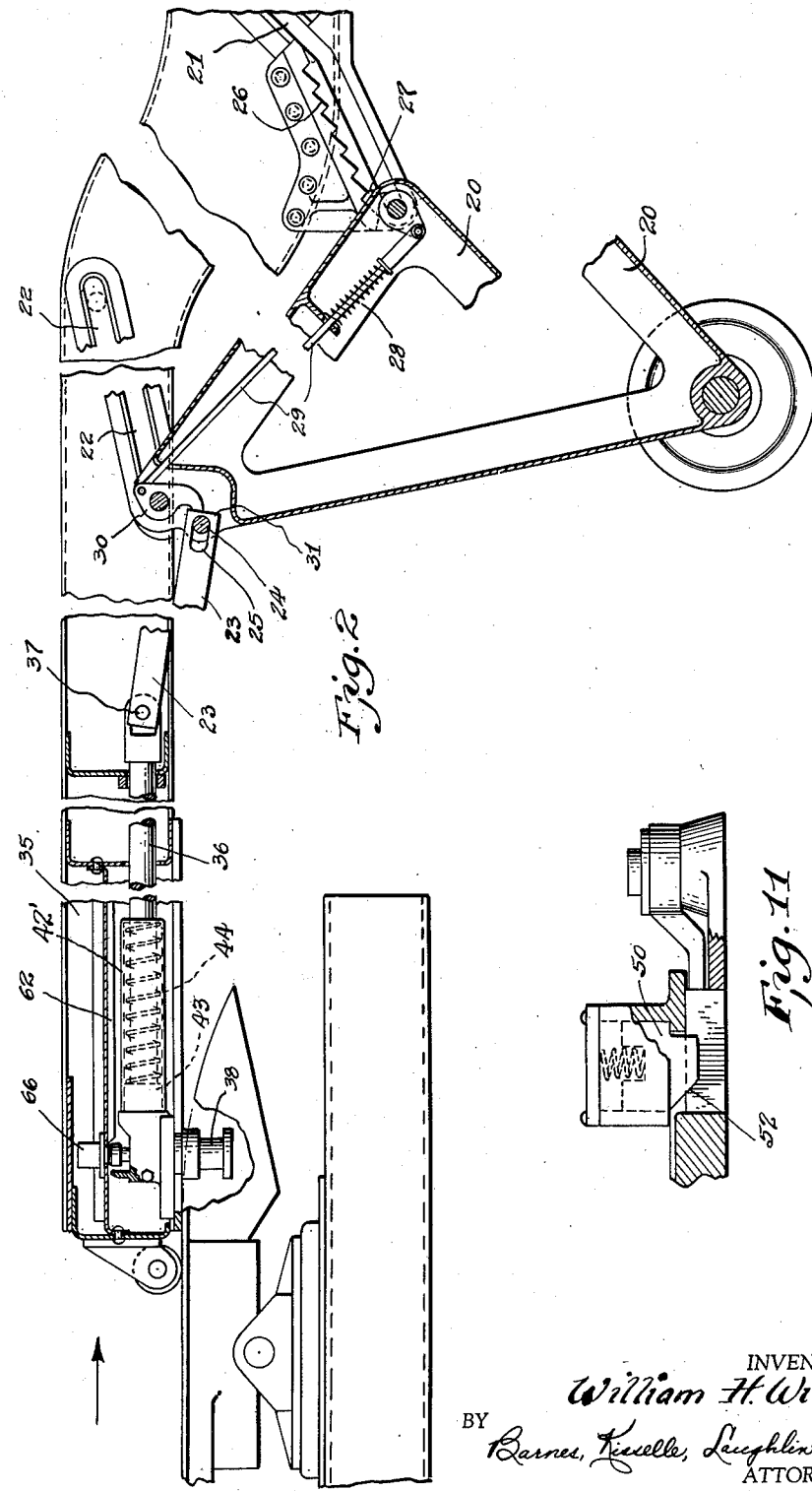

Feb. 17, 1942.    W. H. WILSON    2,273,164
SEMITRAILER
Filed July 20, 1939    4 Sheets-Sheet 3
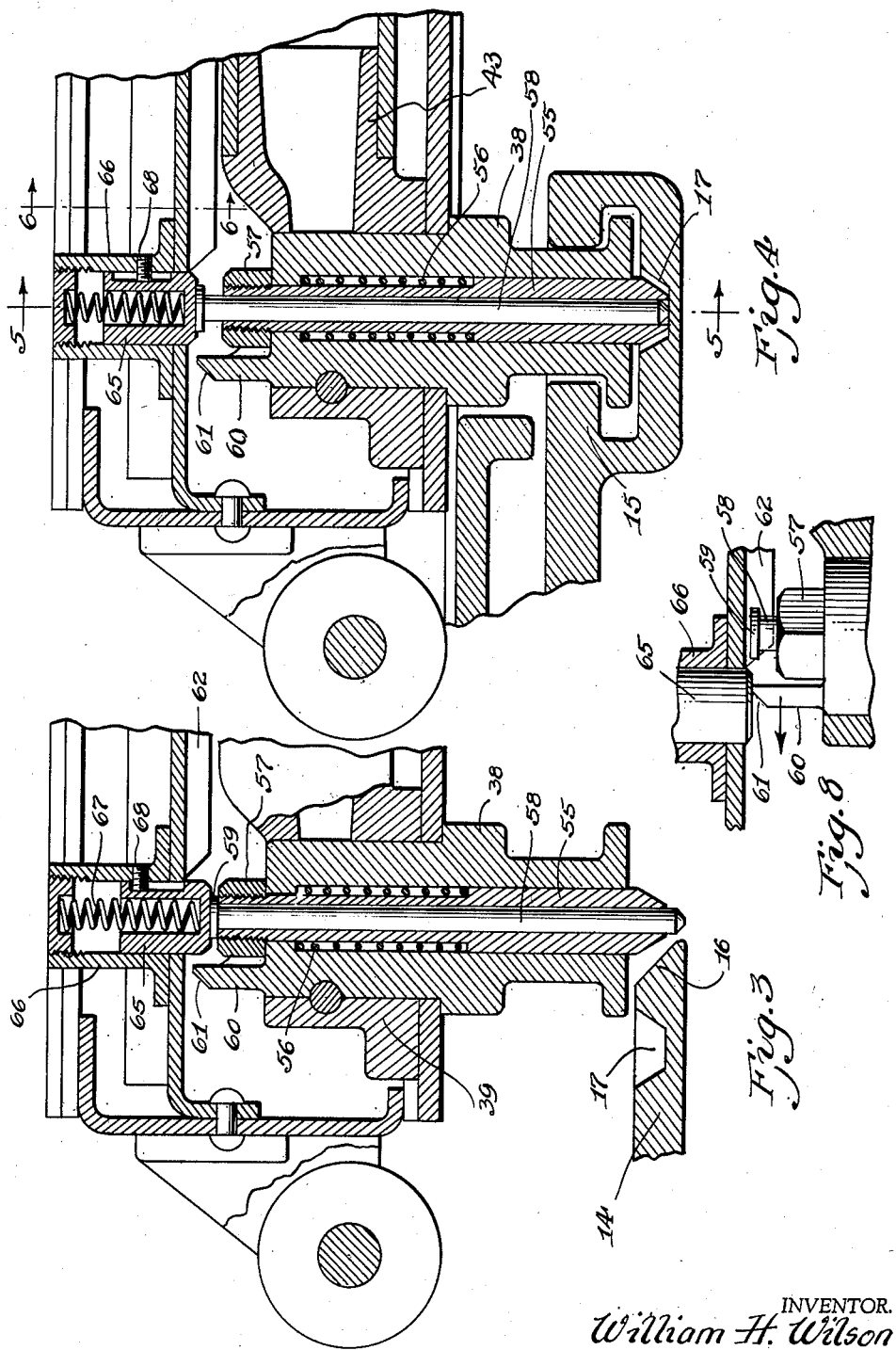
INVENTOR.
William H. Wilson
BY
Barnes, Kisselle, Laughlin & Raisch
ATTORNEYS

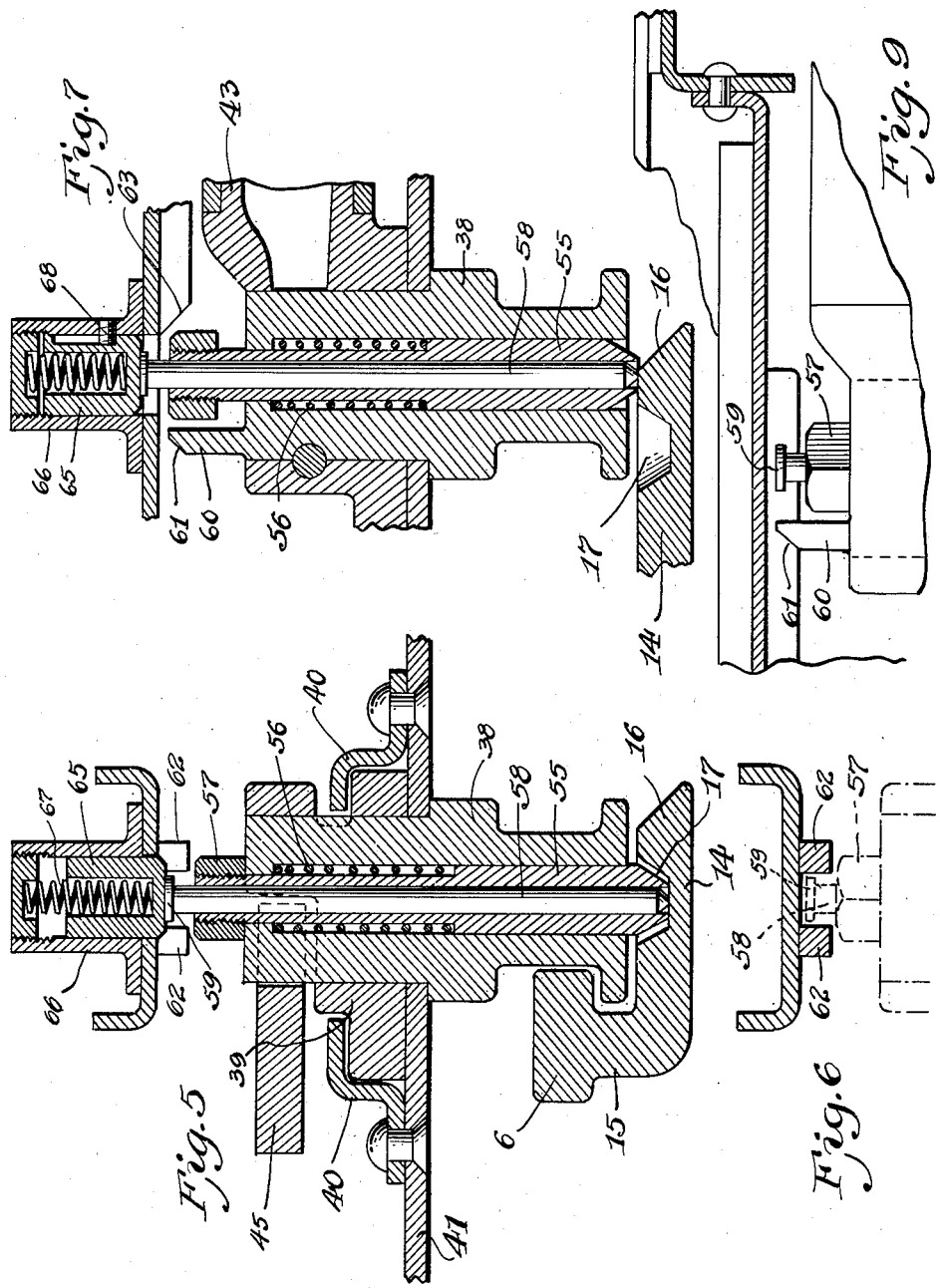

Patented Feb. 17, 1942

2,273,164

UNITED STATES PATENT OFFICE 2,273,164

SEMITRAILER

William H. Wilson, Detroit, Mich.

Application July 20, 1939, Serial No. 285,511

10 Claims. (Cl. 280—33.1)

This invention relates to vehicles of the tractor semi-trailer type, and it is concerned particularly with improvements which will make it feasible to interchange a tractor with different types of semi-trailers.

There are two general classifications of semi-trailers: one is the so-called manual type where the supporting legs are manually operated to and from supporting position, and indeed other operations may be manually effected; the other type is the so-called automatic where the supporting legs automatically shift to supporting position as the tractor separates from the trailer and are automatically shifted back to elevated or transit position as the tractor couples with the semi-trailer.

One form of arrangement of the first mentioned type employs a slotted fifth wheel on the tractor and a depending king pin on the semi-trailer, together with a coupling member for coupling the king pin in the lower fifth wheel member. One form of the automatic semi-trailer employs an upstanding king pin on the lower fifth wheel on the tractor and a movable coupling member on the semi-trailer which is associated with a movable service member on the semi-trailer which is caused to shift fore and aft in uncoupling and coupling respectively and which movement is utilized for operating the supports and/or for operating other things such as the brakes.

It will be seen that such tractors and semi-trailers are not interchangeable in use since the tractors with fifth wheel members designed for use with the non-automatic semi-trailer cannot be used with the automatic type of semi-trailers, and the non-automatic semi-trailer cannot be used with a tractor equipped to function with the automatic type of semi-trailer, and vice versa.

The principal and general object of the invention is to provide an improved arrangement wherein such tractors and semi-trailers are interchangeable so that, for example, an operator who has a fleet of each kind of tractors and semi-trailers may couple any tractor with any semi-trailer. To this end the invention contemplates an improved arrangement wherein a semi-trailer of the automatic type is equipped with a depending king pin so that it may be connected to tractors with slotted lower fifth wheel members, and it also involves certain improved structures for the fore and aft shift of the king pin to perform the automatic operations. It is appreciated that attempts have been made heretofore to put such a shiftable king pin on an automatic type semi-trailer, but the present invention embodies improvements in the structure such that better results are obtained and new results are obtained. The arrangement contemplates a simple improvement in the existing lower fifth wheel member which is used with the non-automatic semi-trailer, but this change is such that a tractor so equipped may be used with both types of semi-trailers. A structure for carrying out the invention is shown in the accompanying drawings.

Fig. 1 is a plan view showing the lower slotted fifth wheel member on the tractor and the forward end of the trailer, showing some of the automatically operated mechanism.

Fig. 2 is a side elevational view showing the rear end of the tractor and the semi-trailer with some parts cut away and some parts in section.

Fig. 3 is an enlarged sectional view taken through the king pin on the semi-trailer and showing the relation of the parts relative to the coupling member on the tractor just before initial connection or just after final separation.

Fig. 4 is a cross sectional view similar to Fig. 3 showing the relation of the parts with the coupling on the tractor associated with the king pin on the trailer and with the king pin in forward position.

Fig. 5 is a cross sectional view taken substantially on line 5—5 of Fig. 4.

Fig. 6 is a cross sectional view taken substantially on line 6—6 of Fig. 4 showing the structure for maintaining the connection between the tractor and semi-trailer for performing the automatic operations.

Fig. 7 is a view similar to Fig. 4 showing the relative position of some of the parts just at the final separation or initial connection.

Fig. 8 is a detailed view partly in section showing how a holding latch structure is operated.

Fig. 9 is a detail view partly in section showing the service member in its rear position.

Fig. 10 is a detail view showing the king pin latched in draft position.

Fig. 11 is a detail view illustrating the manner of function of the draft latch structure.

Fig. 12 is a cross sectional view taken substantially on line 12—12 of Fig. 10.

In carrying out the invention the tractor may be equipped with the usual rocking fifth wheel of the slotted type for functioning with a king pin on the semi-trailer. A fifth wheel is illustrated at 1 slotted as at 2 and having a socket portion 3 for the king pin. The fifth wheel also has a suitable movable latch for coupling with the king pin. As shown this takes the form of a hook member 4 pivoted to the fifth wheel as at 5 having a hook portion 6 for engaging around the king pin and having a heel 7. The hook is shown in open position in Fig. 1. As the king pin moves forwardly into the slot it strikes the heel 7 and swings the hook counter-clockwise. A bolt 8 acted upon by a spring 9 is projected in front of a face portion 10 to lock the hook around the king pin in coupled position. The bolt may be retracted by means of a handle 11. The hook may have a handle-like extension 12. The purpose of this is that when the handle 11 is retracted for release purposes the extension 12 may be grasped to swing the hook slightly to shift the member 10 under the bolt 8 so that the parts remain in position for the swinging of the hook clockwise for disengagement purposes. This hook, in accordance with the invention, is modified as follows: It is provided with a plate 14 designed to underlie the king pin as shown in Fig. 5, and the plate is connected to the hook by a depending U-shaped rib or collar 15. This plate has an inclined surface 16 and a central socket 17 also with inclined walls. The purpose of this modification will presently appear.

The supporting legs may advantageously be and preferably are of the type which may be pulled into supporting position, such for example as the supporting legs shown in application Serial No. 284,157, filed July 13, 1939. Briefly, the leg illustrated comprises a supporting frame 20 mounted in guides 21 and 22 and arranged to be shifted in the guides. It will be understood that there are guides on each side of the trailer frame and that the support includes a frame on each side of the trailer. The operating means comprises links 23 connected to the support as at 24 by a lost play connection residing in the slot 25. A toothed device or rack 26 is engageable by a spring pressed detent 27, the spring being shown at 28, and a rod 29 connects the detent with a rocker member 30, one end of which is arranged to engage the link 23 as at 31. As illustrated in Fig. 2, the legs are in supporting position. If the member 23 is thrust rearwardly, the rocker member 30 is rocked to disengage the detent, and when the lost play movement terminates the members 23 push the legs backwardly and upwardly along the inclined and curved guideways. Then if the members 23 are pulled forwardly the supports are pulled forwardly and the detent 27 is free to engage in one of the notches in the rack so that the support is held in supporting position.

The trailer frame is illustrated at 35, and slidably mounted in the frame is a service member 36 which is connected to the members 23 as at 37. A king pin 38 depends from the trailer frame and it is equipped with a head 39 slidable in guideways 40 on the upper surface of the plate 41, which may constitute the upper fifth wheel member for resting upon the lower fifth wheel member 1. The service member 36 is connected to the head 39 and it preferably embodies a yieldable section where it is to be used with supporting legs of the type described. Attached to the head is a cylinder 42, and the end of the rod 36 has a head 43, and between the head and the end of the cylinder is a spring 44.

The head is cut away as shown in Fig. 12 for the reception of a draft latch 45, which is held latched around the king pin or part thereof or part of the head by a locking member or bolt 46. This locking member is arranged to be retracted as by means of a handle 47 at the side of the trailer, or it may be retracted by the operator from the cab of the tractor through the means of a rod 48 arranged to extend to the cab of the tractor.

This particular draft coupling may be of the type shown in Patent No. 2,135,205. As shown in Fig. 11 there is a spring pressed holding member 50 lying above the bolt 46, which projects in front of the bolt 46 when it is retracted for release purposes. The draft latch 45 has an inclined surface 51 which shifts the bolt 46 further into retracted position as the king pin moves forwardly, and at about this time the draft latch moves in under the member 50 which is facilitated by reason of the inclined surface 52. The draft latch has a heel 53 which is engageable by the head 39 as the king pin moves back into position to swing the draft latch into engagement with the king pin. Since the member 50 was held elevated by the draft latch, the bolt 46 is free to shift into locking position as shown in Fig. 11. Thus it will be noted that the member 50 acts to temporarily hold the bolt 46 retracted until an uncoupling has been made. In the coupling action the bolt 46 is projected against the surface 54 of the latch as the latch swings, at which time the bolt 46 underlies the latch 50 so that the latch 50 does not block the bolt during the coupling action.

The king pin has a central bore in which there is positioned two plungers or pins. As shown herein these are axially disposed one within the other. One pin or plunger 55 is acted upon by a spring 56 and has a head portion 57 which may be constituted by a nut. The other pin 58 slides within the pin or plunger 55 and has a head portion 59. In this connection the king pin has a projection 60 with an inclined face 61. On the semi-trailer frame are two guides 62 which are spaced from each other and which overlie the head 57, but which receive between them the head of the pin 58. These guides terminate with an inclined surface adjacent the forward end of the trailer as shown at 63. Just forward of the inclined portion 63 is a spring pressed locking member 65 fixedly positioned in a portion 66 which is secured to the semi-trailer frame, and in which the locking member reciprocates. The spring acting upon this member is shown at 67. As shown in Fig. 3 the locking member projects downwardly just forwardly of the forward ends of the guides 62. The plunger 55 may be held in its socket by a screw or the like 68 operating in a slot in the portion 66.

The plungers 55 and 58 cooperate with the plate 14 on the draft hook 4 and perform certain functions in the control of the movements of the draft hook 4, and functions on the locking member 65. These functions can perhaps be best described in a consideration of the operation of the entire structure.

Let us start with the tractor and semi-trailer in uncoupled relation as shown in Figs. 1 and 2. The draft latch 4 is positioned as indicated so that the king pin may move into its hook. At this time the king pin is in its forward position as indicated in Fig. 3. The king pin cannot move rearwardly because the projection 60 engages behind the lock 65. As shown in Fig. 3 the projection is spaced forwardly from the lock 65, but this may be the case in some instances, it being a fact that the king pin is locked forwardly. As the tractor backs into the trailer the king pin strikes the heel 7 and swings the member 4 counter-clockwise, and ultimately the bolt 8 is projected forwardly of the surface 10. As the hook swings the inclined surface 16 moves under the plungers 55 and 58 and elevates them as shown in Fig. 7. The plunger 58 in its upward movement shifts the locking member 65 back into its socket and holds the locking member 65 in released position after the plunger 58 seats in the recess 17, as shown in Fig. 5. The plunger 55 can also elevate, as shown in Fig. 7, because it is forward of the guides 62. As the tractor now moves back in the frame the king pin is caused to shift rearwardly in the guides 40 and the legs are elevated. Indeed, various other service operations can be performed by the service member 36, but for purposes of illustration it is merely shown that certain work can be performed, and to illustrate this the supporting legs have been selected. When the king pin reaches the rearmost position with the legs elevated, the head strikes the heel 53 of the draft latch 45 and it is swung to draft coupling position as shown in Fig. 4 in the manner above described. The tractor and semi-trailer are now coupled for combined operation.

To uncouple the vehicles, the operator retracts the bolt 8 and slightly rocks the draft hook 4 so that it blocks off the bolt 8. Also, the operator retracts the bolt 46 to a position where it is held retracted by the member 50. The tractor may now be driven forwardly. Ordinarily, however, the draft hook 4 may freely swing to disengage the king pin and, of course, if this happened the legs would not be pulled downwardly nor would the service member be pulled forwardly for any other operation. As soon as the tractor pulls forwardly, however, in which action there is a tendency to swing the draft hook 4, such swinging movement is prevented by the plunger 55. The inclined surfaces of the recess 17 may tend to project the plunger 55 therefrom, but this cannot be done because the head 57 underlies the guides or rails 62. Therefore, the draft hook cannot swing and, as the tractor moves forwardly, the king pin is positively pulled forwardly in the semi-trailer frame. As the king pin reaches the forward end of its movement, the projection 60, due to its inclined surface, moves under the locking member 65 as shown in Fig. 8, and as soon as the head 57 moves out from beneath the rails 62, the plunger 55 may be projected upwardly upon rocking movement of the draft hook 4, as shown in Fig. 7, thus permitting the lower fifth wheel on the tractor to pull away from the king pin on the semi-trailer. In the rocking movement of the draft hook the plungers ride down the inclined surface 16 and thus the member 65 is projected into a position to lock the king pin forwardly.

It might be stated, in addition, that the king pin must move to a predetermined forward position. At times the supporting legs may strike the ground before the king pin reaches this position. In this event, the spring 44 is compressed, which results in an extension, so to speak, of the service member, while the detent 27 engages in one of the rack teeth to hold the support in its supporting position, which may vary incident to the contour of the ground. When the spring 44 is thus compressed it will tend to pull the king pin backwardly, but this is prevented by the locking member 65 and the projection 60.

Thus a tractor with a fifth wheel of the type shown in Fig. 1 can be used with this automatic trailer. At the same time a tractor thus equipped may be used with a non-automatic trailer which is merely equipped with a depending king pin in a fixed position. In this latter event the plate 14 merely rides under the fixed king pin and may perform no function. So it is that by merely equipping the draft hook with the plate, such as the plate 14, the tractor may be used with automatic and non-automatic semi-trailers.

I claim:

1. In a semi-trailer for use with a tractor having a socket and a movable draft coupling member, a king pin for cooperation with the socket and coupling member and mounted for fore and aft movement on the semi-trailer, a service member connected to the king pin, draft means for holding the king pin at the rear of its movement whereby a draft coupling is established through the draft means and coupling means, means for releasing the draft means and coupling member, a plunger in the king pin for engaging the coupling member, guide devices for the plunger arranged to maintain such engagement so that the coupling member may pull the king pin forwardly, said guide devices releasing the plunger substantially at the forward end of movement of the king pin, means for locking the king pin in its forward position, and another plunger in the king pin operable by the coupling member as it cooperates with the king pin to release the locking means.

2. In a semi-trailer, a king pin mounted for fore and aft movement, a service member connected to the king pin, releasable draft means for holding the king pin at the rear of its movement, a plunger in the king pin for engaging and holding a movable coupling member on a tractor in engagement with the king pin, guide means effective on the plunger at positions of the king pin rearward of substantially its forward position for maintaining the plunger in such holding engagement, a locking device for holding the king pin at its forward position, and another plunger in the king pin operable by the said movable coupling member to release the said locking device.

3. In a semi-trailer, a king pin mounted for fore and aft movement, a service member connected to the king pin, releasable draft means for holding the king pin at the rear of its movement, a plunger in the king pin for engaging and holding a movable coupling member on the tractor in engagement with the king pin, guide means extending along the path of the king pin for holding the plunger in such holding engagement with the coupling member substantially during the travel fore and aft of the king pin and arranged to release the plunger from such holding engagement substantially at the forward position of the king pin, a locking device for holding the king pin at its forward position, and another plunger in the king pin operable by said movable coupling member on the tractor in the coupling operation to release the said locking device.

4. In a tractor semi-trailer combination, a slotted fifth wheel member on the tractor having a part for receiving the king pin and having a movable draft coupling member for engaging the king pin, a depending king pin on the semi-trailer, means mounting the king pin for fore and aft movement, service means connected to the king pin for performing a service operation, a draft latch for engaging the king pin in its rear position for coupling the tractor and semi-trailer, means for releasing the draft latch and the draft coupling member, means on the trailer for holding the draft coupling member on the tractor in coupled relation with the king pin as the king pin moves subsequent to the release of the draft coupling member, whereby the tractor pulls the king pin and service means forwardly in the uncoupling action, said means being automatically released as the king pin reaches its forward position for movement of the coupling member on the tractor from engagement with the king pin to complete the uncoupling action, locking means for holding the king pin in said forward position, said coupling member on the tractor being shiftable into coupling relation with the king pin as it engages the king pin in the coupling action, and means operable by such movement of the coupling member to disengage the locking means for rearward shift of the king pin.

5. In combination, a tractor having a lower fifth wheel and a coupling member, a semi-trailer having a king pin for cooperation with the coupling member, means mounting the king pin for fore and aft movement, a service member connected to the king pin, draft means for holding the king pin at the rear of its movement whereby a draft connection is established through the draft means, king pin and coupling member, means for releasing the draft means and coupling member, a plate on the coupling member and movable therewith and arranged to underlie the king pin, a plunger in the king pin for engaging the plate and guide means for holding the plunger in engagement with the plate to in turn hold the coupling member against release from the king pin during tractor semi-trailer separation whereby the coupling member may pull the king pin forwardly after the same has been released, said guide means terminating short of the forward end of the movement of the king pin.

6. In combination, a tractor having a lower fifth wheel and a coupling member, a semi-trailer having a king pin for cooperation with the coupling member, means mounting the king pin for fore and aft movement, a service member connected to the king pin, draft means for holding the king pin at the rear of its movement whereby a draft connection is established through the draft means, king pin and coupling member, means for releasing the draft means and coupling member, a plate on the coupling member and movable therewith and arranged to underlie the king pin, a plunger in the king pin for engaging the plate and guide means for holding the plunger in engagement with the plate to in turn hold the coupling member against release from the king pin during tractor semi-trailer separation whereby the coupling member may pull the king pin forwardly after the same has been released, said guide means terminating short of the forward end of the movement of the king pin, and a locking device for holding the king pin in its forward position.

7. In combination, a tractor having a lower fifth wheel and a coupling member, a semi-trailer having a king pin for cooperation with the coupling member, means mounting the king pin for fore and aft movement, a service member connected to the king pin, draft means for holding the king pin at the rear of its movement whereby a draft connection is established through the draft means, king pin and coupling member, means for releasing the draft means and coupling member, a plate on the coupling member arranged to underlie the king pin, a plunger in the king pin for engaging the plate and guide means for holding the plunger in engagement with the plate to in turn hold the coupling member against release from the king pin during tractor semi-trailer separation whereby the coupling member may pull the king pin forwardly, said guide means terminating short of the forward end of the movement of the king pin, and a locking device for holding the king pin in its forward position, and another plunger in the king pin and operable by the plate in tractor semi-trailer coupling operation to release the locking member.

8. In combination, a tractor having a lower fifth wheel and a coupling member, a semi-trailer having a king pin for cooperation with the coupling member, means mounting the king pin for fore and aft movement, a service member connected to the king pin, draft means for holding the king pin at the rear of its movement whereby a draft connection is established through the draft means, king pin and coupling member, means for releasing the draft means and coupling member, a plate on the coupling member arranged to underlie the king pin and having a socket, said plate having inclined surfaces leading to and from the socket, a plunger in the king pin, means for holding the plunger in the socket subsequent to the release of the draft means and coupling member to hold the coupling member against releasing movement whereby the tractor may pull the king pin forwardly, said means releasing the plunger substantially at the forward end of the movement of the king pin for movement of the plunger over the inclined surfaces.

9. In combination, a tractor having a lower fifth wheel and a coupling member, a semi-trailer having a king pin for cooperation with the coupling member, means mounting the king pin for fore and aft movement, a service member connected to the king pin, draft means for holding the king pin at the rear of its movement whereby a draft connection is established through the draft means, king pin and coupling member, means for releasing the draft means and coupling member, a plate on the coupling member arranged to underlie the king pin and having a socket, said plate having inclined surface leading to and from the socket, a plunger in the king pin, means for holding the plunger in the socket subsequent to the release of the draft means and coupling member to hold the coupling member against releasing movement whereby the tractor may pull the king pin forwardly, said means releasing the plunger substantially at the forward end of the movement of the king pin, a locking device for holding the king pin in its forward position, a second plunger in the king pin and operable by one of the inclined surfaces of the plate as the coupling member moves into engagement with the king pin to release the locking device for rearward movement of the king pin.

10. In combination, a tractor having a lower fifth wheel and a coupling member, a semi-trailer having a king pin for cooperation with the coupling member, means mounting the king pin for fore and aft movement, a service member connected to the king pin, draft means for holding the king pin at the rear of its movement whereby a draft connection is established through the draft means, king pin and coupling member, means for releasing the draft means and coupling member, a plate on the coupling member arranged to underlie the king pin and having a socket, said plate having inclined surfaces leading to and from the socket, two plungers in the king pin, one lying within the other, means for holding one plunger in the socket subsequently to the release of the draft means and coupling member whereby the tractor may pull the king pin forwardly, said means being arranged to release the plunger substantially at the end of the movement of the king pin for final disconnection between the coupling member and the king pin, a locking device for holding the king pin in its forward position, the other plunger being operable by some of the inclined surfaces on the plate incident to movement of the coupling member into engagement with the king pin for shifting the locking device into unlocking position for rearward movement of the king pin.

WILLIAM H. WILSON.